United States Patent [19]

Hill et al.

[11] 3,937,263

[45] Feb. 10, 1976

[54] TIRE CHAIN CONTAINER AND MOUNTING AID

[76] Inventors: Milburn L. Hill, 4645 Cambio Court; Ken M. Sawyer, 35464 Cabral Drive, both of Fremont, Calif. 94536

[22] Filed: Feb. 28, 1974

[21] Appl. No.: 446,609

[52] U.S. Cl. .............................. 152/213 R; 254/88
[51] Int. Cl.² ........................................ B60C 27/00
[58] Field of Search............ 152/208, 213 R, 213 A, 152/221–230; 81/15.8; 254/88

[56] References Cited
UNITED STATES PATENTS

| | | | |
|---|---|---|---|
| 1,189,632 | 7/1916 | Seitz | 152/213 R |
| 2,272,334 | 2/1942 | St. Laurent | 254/88 |
| 2,450,648 | 10/1948 | Felzer | 254/88 |
| 3,381,556 | 5/1968 | Pisciotta | 152/213 R |

*Primary Examiner*—Drayton E. Hoffman
*Attorney, Agent, or Firm*—Rankin A. Milliken

[57] ABSTRACT

A tire chain container and mounting aid is disclosed which includes a pair of hollow shells which, when fastened together in open-face-to-open-face relation, form a closed container capable of containing both of the anti-skid tire chains used in connection with a particular motor vehicle, and which are so contoured and of such structural strength as to be capable of serving as ramps onto which the rear wheels of the motor vehicle may be driven to facilitate mounting of the tire chains.

1 Claim, 4 Drawing Figures

TIRE CHAIN CONTAINER AND MOUNTING AID

The present invention relates to apparatus for aiding in the mounting of anti-skid tire chains on the wheels of motor vehicles, and for aiding in the removal of anti-skid tire chains from the wheels of motor vehicles. More particularly, the present invention relates to tire chain mounting devices of the kind which include tire supporting ramps.

The prior art includes ramp means for facilitating the mounting of tire chains on the wheels of motor vehicles. Such prior art ramp means, however, must be carried in the trunk or other storage space of the motor vehicle in addition to and separate from the tire chains themselves.

The tire chains of a typical motor vehicle are commonly found lying loose in the trunk of the vehicle, which leads to staining of the trunk lining or other items in the trunk, or jumbled in a pasteboard box, which leads to the tangling of the chains, and the necessity for untangling the chains in wet, cold, and generally uncomfortable conditions before they can be mounted on the wheels of the vehicle.

Therefore, it is an object of the present invention to provide ramp means for aiding in the mounting of anti-skid tire chains on the wheels of motor vehicles, which ramp means also constitute a container for the tire chains, thereby reducing the trunk space consumed by the tire chains and mounting ramp means.

It is a further object of the present invention to provide separate pockets or cavities for receiving the two tire chains used in connection with a single motor vehicle, thereby preventing the tangling of the tire chains while they are stored, e.g., in the trunk of the vehicle.

It is yet another object of the present invention to provide ramp means which cooperate to form a closed container for a pair of tire chains, thus preventing contact of the tire chains with the trunk lining, and thereby preventing water, rust, and salt staining of the trunk lining, and items stored in the trunk.

Other objects of the present invention will in part be obvious, and will in part appear hereinafter.

The present invention, accordingly, comprises the features of construction, combinations of elements, and arrangements of parts which are exemplified in the construction hereinafter set forth, and the scope of the present invention will be indicated in the appended claims.

For a full understanding of the nature and objects of the present invention, reference should be had to the following detailed description, taken in conjunction with the accompanying drawings.

DETAILED DESCRIPTION OF THE INVENTION

Figure 1:
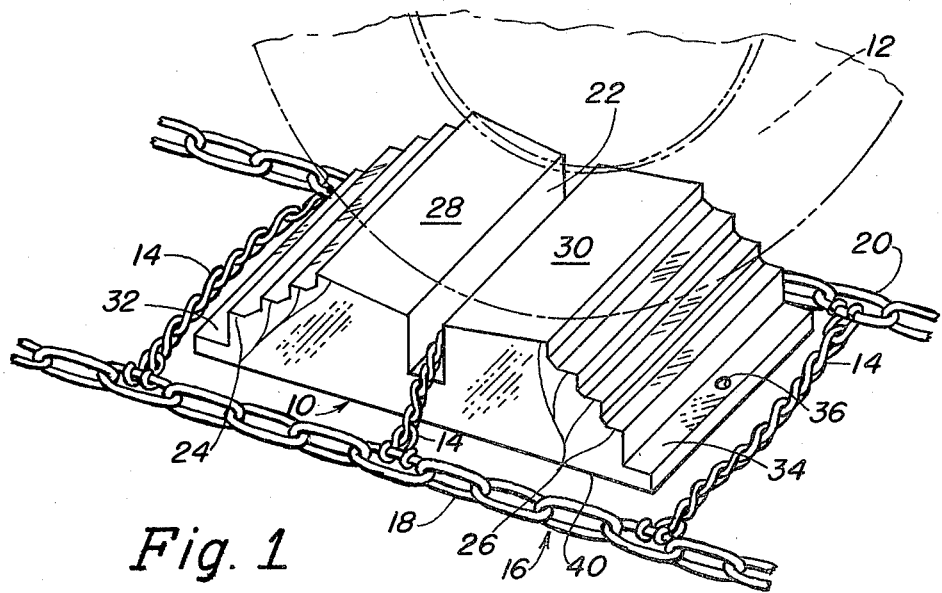
FIG. 1 is a perspective view of one of the container-halves or shells of the present invention as it is used in mounting a tire chain on a wheel of a vehicle.

Referring now to FIG. 1 there is shown a shell 10 of a preferred embodiment of the present invention, upon which is disposed a wheel 12 of an automobile and a cross-link 14 of an anti-skid tire chain 16.

In accordance with the principles of the present invention, the width of shell 10 is less than the length of the cross-links 14 of the size of tire chain which the shell 10 and a substantially similar mating shell (see FIG. 3) are adapted to contain. (This last statement should not be construed as indicating that a different size of shell is required for every size of tire chain. To the contrary, it is a feature of the present invention that very few, perhaps three, sizes of shell embodying the present invention will accommodate all of the sizes of tire chains commonly fitted to standard highway vehicles in the United States.)

As further seen in FIG. 1, shell 10 is provided with a channel 22 adapted to completely contain one of the cross-links 14 of a tire chain when shell 10 is being used to facilitate the mounting of the tire chain.

A further feature of the shell 10 of the present invention is the provision of a plurality of transverse ribs 24, 26 (FIG. 1) which engage the outer face of vehicle tire 12 as the vehicle is being driven onto or off of ramp 10, thereby tending to prevent slippage between the ramp 10 and the vehicle tire 12.

As best seen in FIG. 1, the upper plane surfaces 28, 30 of shell 10 are slightly sloped inwardly toward channel 22, thus tending to maintain the vehicle tire 12 (and the wheel upon which it is mounted) in place on ramp 10, and tending to maintain the vehicle in place on the roadway while the tire chain is being applied with the aid of shell 10.

While the shell 10 of the present invention and its use in mounting a tire chain upon a motor vehicle is being described without reference to its mating shell, which coacts with it to contain a pair of tire chains when those tire chains are not mounted on the vehicle, it is to be understood that the present invention contemplates the simultaneous use of shell 10 and its mating shell in mounting a pair of tire chains on a vehicle, the rear tires, and wheels, of the vehicle being simultaneously driven onto shell 10 and its mating shell.

Figures 3, 4:
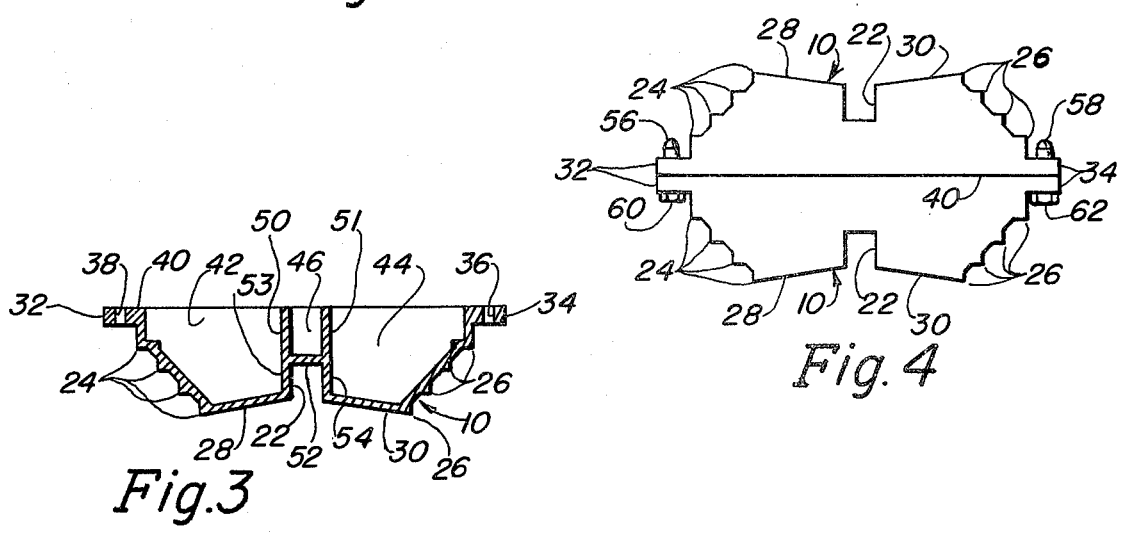
FIG. 3 is a sectional view of the shell of FIG. 2, taken on plane 3—3 of FIG. 2, illustrating the two separate tire chain receiving pockets, and the spare link receiving pocket disposed in the partition and shell strengthening element located therebetween.
FIG. 4 is a side view of a complete embodiment of the present invention, including two container-halves or shells fastened in open-face-to-open-face relation.

As further seen in FIG. 1, a pair of flanges 32, 34 are provided at the ends of shell 10. As best seen in FIG. 3, the mating shell is also provided with a pair of such flanges. Flange 34 is provided with a hole 36 adapted to accommodate a fastener by means of which shell 10 and its mating shell are fastened together while a pair of tire chains is stored therein. Flange 32 is provided with a similar hole 38 (not shown in FIG. 1). Holes 36 and 38 are symmetrically located at the plane of symmetry of shell 10, so that when a substantially identical shell is mated in open-face-to-open-face relation with shell 10 the holes in their end flanges WILL be in registration, to receive a pair of fasteners for fastening the mating shells together.

In accordance with a particular feature of the present invention, no protrusions, such as integral fasteners or the like, which extend through the plane of the open face 40 of shell 10 are provided. It was recognized in the making of the present invention, that such protrusions would act as points of stress concentration when the shell was disposed on a hard surface (e.g., a concrete roadway) and was bearing the weight of a vehicle, thus tending to rupture the shell.

Figure 2:
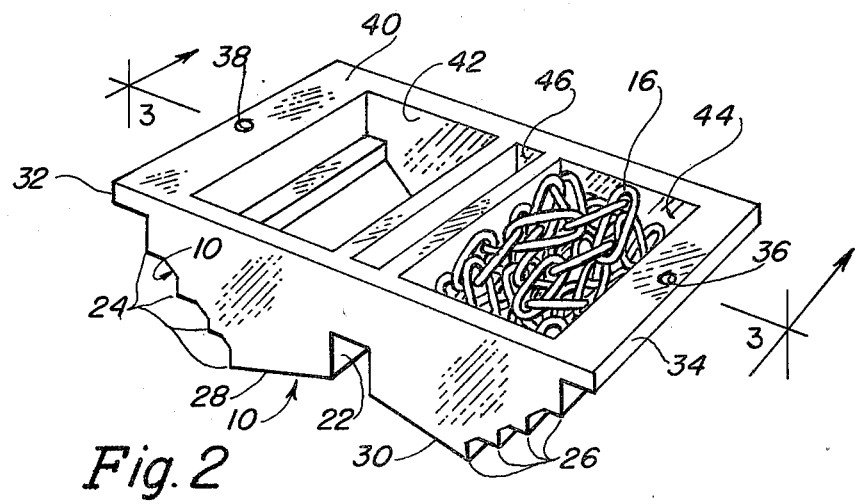
FIG. 2 is a perspective drawing of one of the container halves or shells of an embodiment of the present invention, so disposed as to illustrate its two tire chain receiving pockets, in one of which a tire chain is disposed.

Going now to FIG. 2, there is seen shell 10 in a position inverted with respect to the position shown in FIG. 1.

In FIG. 2 it may be seen that shell 10 defines within itself three pockets or cavities 42, 44, and 46. The two larger pockets 42, 44 are of such a size as to each be capable of containing one tire chain of the largest size with which the shell 10 is adapted to cooperate (it is not contemplated that such a maximum size tire chain will necessarily be entirely contained within a pocket 42, 44, but rather that such a maximum size tire chain can be easily piled in one of the pockets 42, 44, without spilling onto or projecting above open mating face 40.)

In addition to the tire chain receiving pockets 42, 44, shell 10 is also provided with a smaller central pocket 46, wherein may be stored tire chain hardware, such as spare links and spare tire chain clips.

Going now to FIG. 3, there is shown the cross-sectional configuration of a shell 10 embodying the preferred form of the present invention. It is to be particularly noted that, in accordance with the principles of the present invention, the small storage pocket 46 is defined by two side walls 50, 51, and a bottom wall 52. It is to be further noted that the inner side walls of the chain receiving pockets 42, 44 consist of said small pocket sidewalls 50, 51 and also additional side members 53, 54; all of said wall members 50, 51, 52, 53, 54 being integral, and the side wall members 53, 54 being integral with the aforementioned plane bottom surfaces 28, 30. By this construction an integral strengthening bridge is provided, whereby shell 10 may be made as light as possible consistent with two such shells being capable of supporting the full weight of the rear end of the motor vehicle while tire chains are being mounted on the rear wheels thereof.

Going now to FIG. 4 there is shown a pair of shells 10, described hereinabove, which are fastened in open-face-to-open-face relation for containing a pair of tire chains and associated hardware. These two shells 10 are fastened together by means of bolts 56, 58 coacting with nuts 60, 62, each nut if desired, being of the type incorporating a device for resiliently engaging the material through which it passes, in this case the flanges 32, 34, whereby to prevent the working loose of these nuts due to vibration.

It is to be understood that the particular arrangement of nuts 60, 62 and bolts 56, 58 illustrated and described hereinabove are not the only means by which a pair of shells 10 of the present invention may be fastened together for containing a pair of tire chains. For instance, a belt or strap having a friction buckle (sometimes called a "bookstrap") may be passed through both of the channels 22 when a pair of shells 10 is in face-to-face relation, and drawn tight, the shells thereby being maintained in face-to-face relation for storing a pair of tire chains. Other fastening arrangements will be provided by those having ordinary skill in the art without the exercise of invention. It is to kept in mind, however, that in accordance with one aspect of the present invention no protrusions are to project from the mating faces 40 of the shells 10.

It will now be seen that the objects set forth above, among those made apparent from the preceding description, are efficiently attained, and since certain changes may be made in the above construction without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

Having described the present invention, what is claimed as new and desired to be secured by Letters Patent is:

1. A tire chain container and mounting aid comprising a pair of shells, each shell being capable of bearing the weight of a motor vehicle when one of the wheels of the motor vehicle is disposed thereon, each shell having a flat face through which a pair of pockets open, each pocket registering with a pocket in the other shell when said flat faces are brought together in registration, thus forming a pair of separate chambers, each chamber being adapted to contain a tire chain, the pair of pockets in at least one of said shells being separated by a common wall containing a third pocket of such size as to be capable of containing spare tire chain hardware, such as spare links, tire chain clips, or the like, and the common wall between the tire chain receiving pockets of each shell containing a channel open to the side of the shell opposite its said flat face and extending to and through each wall of the shell which is perpendicular to said common wall.

* * * * *